United States Patent [19]
Rieke et al.

[11] Patent Number: 5,345,924
[45] Date of Patent: Sep. 13, 1994

[54] COLD SPOT BAFFLE FOR COUPLING BOX

[75] Inventors: Larry D. Rieke, Zionsville; Eric A. Harvey, Plainfield, both of Ind.

[73] Assignee: Carrier Corporation, Syracuse, N.Y.

[21] Appl. No.: 87,208

[22] Filed: Jul. 2, 1993

[51] Int. Cl.[5] ............................................... F24H 3/02
[52] U.S. Cl. ........................... 126/110 R; 126/116 R; 165/913
[58] Field of Search ............ 126/110 R, 110 A, 99 A, 126/99 R, 116 R, 116 B, 116 A; 165/913

[56] References Cited

U.S. PATENT DOCUMENTS

| | | | |
|---|---|---|---|
| 4,275,705 | 6/1981 | Schaus et al. | 126/116 R |
| 4,848,314 | 7/1989 | Bentley | 126/110 R |
| 5,042,453 | 8/1991 | Schellenberger | 126/110 R |

Primary Examiner—James C. Yeung

[57] ABSTRACT

A coupling box for a condensing furnace having primary and secondary heat exchangers places the discharge ports of the primary heat exchanger in fluid communication with the inlet ports of the condensing heat exchanger. A baffle in the coupling box directs the flow of flue gas evenly therein to maintain temperature equilibrium so that water vapor does not condense in the coupling box.

5 Claims, 3 Drawing Sheets

COLD SPOT BAFFLE FOR COUPLING BOX

BACKGROUND OF THE INVENTION

1. Field of the Invention

This invention relates in general to condensing furnaces and, in particular, to the coupling box that connects the primary heat exchanger and condensing heat exchanger of a condensing furnace. More specifically, but without restriction to the particular embodiment hereinafter shown and described, this invention relates to a baffle positioned within the coupling box to direct flow of flue gas evenly throughout the coupling box.

2. Discussion of the Prior Art

The residential heating industry has benefitted with the advent of condensing gas furnaces. These furnaces typically include a primary heat exchanger positioned adjacent a secondary or condensing heat exchanger. A blower provides air flow over the heat exchangers to produce heated air that may be channeled and directed to a desired location.

Both the primary heat exchanger and the condensing heat exchanger include cells with channels formed therein to direct the flow of flue gas. These cells are positioned side by side in a parallel manner and are provided with a predetermined spacing to allow the blower air to flow around the cells. The blower air is heated by convection as it moves over the cells.

Gas is provided to the furnace by a gas manifold, and manifold orifices then direct the gas into burners contained in a burner box. The gas is ignited as it exits the burners contained in the burner box. The heated flue gas is then directed into the primary heat exchanger cells and is induced to move therethrough. The channels provided in the primary heat exchanger cells eventually terminate at discharge ports. The discharge ports of the primary heat exchanger are typically aligned and secured in a first sheet metal panel.

The condensing heat exchanger of these furnaces is configured in a similar manner. A series of condensing cells is provided in a side by side manner. Each of these condensing cells has an inlet port for receiving the flue gas discharged from the primary heat exchanger. The inlet ports of the condensing heat exchanger cells are aligned and secured in a second sheet metal panel.

The two heat exchangers are mounted together to form a single integral unit capable of receiving and heating clean intake air provided from the blower. Once mounted together in a single unit, the two sheet metal panels join to form a single planar region containing the discharge ports of the primary heat exchanger and the inlet ports of the condensing heat exchanger.

In order for the furnace to function properly, it is necessary to fluidly connect, in a closed manner, the discharge ports of the primary heat exchanger to the inlet ports of the condensing heat exchanger to prevent the flue gas from mixing with the intake air provided by the blower. This has typically been accomplished by providing a shallow pan-shaped coupling box to cover the planar region containing the discharge ports of the primary heat exchanger and the inlet ports of the condensing heat exchanger.

Proper functioning of condensing furnaces also requires that the water vapor existing in the combustion products carried in the flue gas is condensed only in the condensing heat exchanger and not elsewhere within the furnace. Condensation is prevented from forming in the primary heat exchanger by directing the proper air flow over the heat exchanger as a function of temperature. The coupling box, however, is not situated directly within the air flow and is thus subject to possible temperature variations. These temperature variations are further maintained because the heated flue gas does not evenly flow through the coupling box. Such temperature variations in prior coupling boxes can cause water vapor existing in the combustion products carried in the flue gas to condense within the coupling box. When water thus condenses in the coupling box, the box becomes subject to corrosion and ultimate failure resulting in possible leakage of flue gas into the immediate environment.

OBJECTS AND SUMMARY OF THE INVENTION

It is, therefore, an object of the present invention to improve condensing furnaces.

A further object of the present invention is to maintain temperature equilibrium within the coupling box of a condensing furnace.

It is yet a further object of the present invention to prevent corrosion and failure of the coupling box of a condensing furnace by preventing water vapor from condensing in the coupling box.

Still another object of the present invention is to prevent cold spots from forming in the coupling box of a condensing furnace so that water vapor does not condense within the coupling box.

These and other objects are attained in accordance with the present invention wherein there is provided a coupling box having a shallow rectangular pan shape. The coupling box has raised side portions and an outwardly extending flange formed around the edge of the side portions. The flange portion allows the coupling box to be easily mounted against the planar region area of the furnace containing the discharge ports of the primary heat exchanger and the inlet ports of the condensing heat exchanger. The coupling box, once mounted to the furnace, creates a chamber that places the discharge and inlet ports in fluid communication with each other.

A baffle is provided in the lower portion of the coupling box. The baffle extends from side to side of the coupling box and has an upper edge that extends beyond the flange portion when the box is uncoupled from the heat exchangers. In this manner, when the coupling box is fastened to the primary and condensing heat exchangers, the extending upper edge of the baffle seals against the face of the condensing heat exchanger.

The baffle is positioned within the coupling box approximate to the inlet ports of the condensing heat exchanger. With the baffle thus positioned within the coupling box, the chamber is effectively divided into two regions: a first internal region in direct communication with the discharge ports of the primary heat exchanger and a second internal region in direct fluid communication with the inlet ports of the condensing heat exchanger. The baffle is further provided with small openings to allow flue gas to pass from the first to the second internal regions. The baffle and its openings thus first direct the flue gas toward the extreme lower portion of the coupling box and then into the inlet ports of the condensing heat exchanger. The positioning of the baffle in this manner directs the flow of flue gases evenly throughout the coupling box. This even flow of flue gas maintains temperature equilibrium within the box, thus preventing the formation of cold spots where condensation would otherwise form. Water vapor contained in the combustion products carried by the flue gas is prevented from condensing within the coupling box. Corrosion and failure of the coupling box is thereby prevented and the undesirable effect of discharging the flue gas into the immediate environment is avoided.

BRIEF DESCRIPTION OF THE DRAWING

Further objects of the present invention together with additional features contributing thereto and advantages accruing therefrom will be apparent from the following description of the preferred embodiment of the invention which is shown in the accompanying drawing, wherein.

DETAILED DESCRIPTION OF A PREFERRED EMBODIMENT

Figure 1:
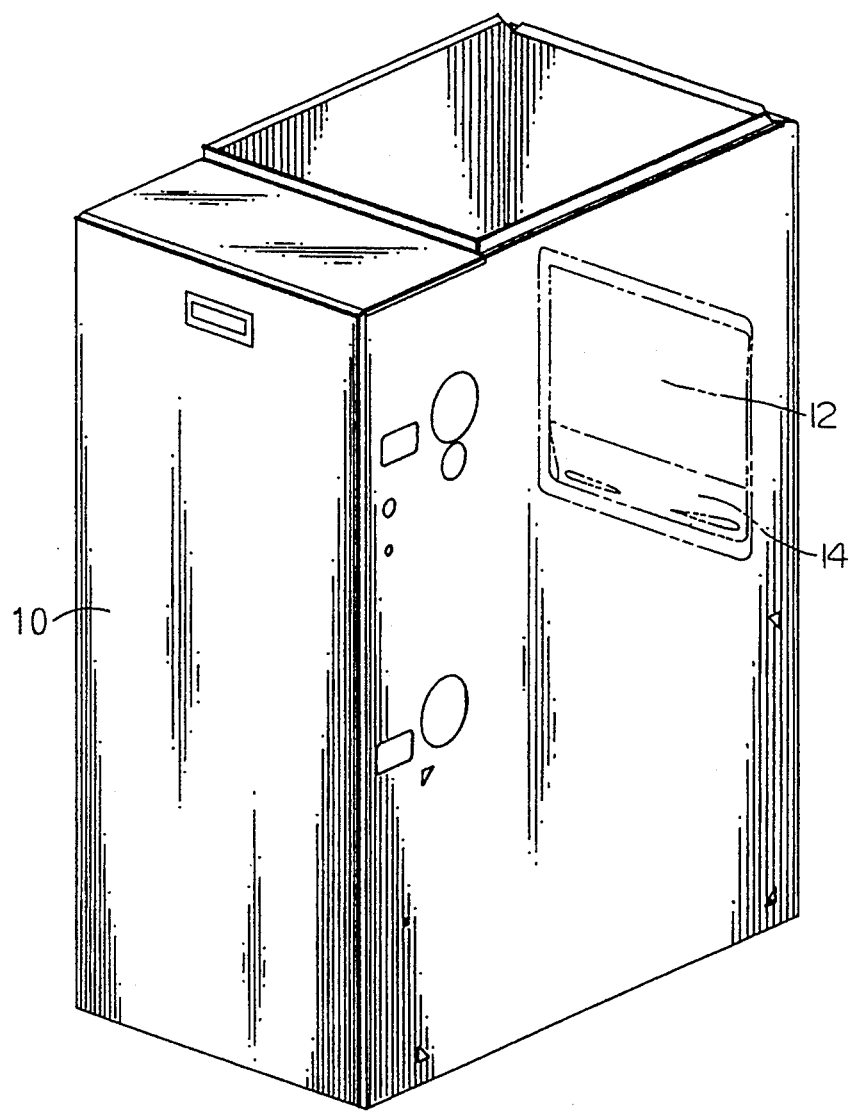
FIG. 1 is a perspective view of a condensing furnace showing in phantom a coupling box in accordance with the present invention.

Referring now to FIG. 1 there is shown a condensing furnace 10 including a coupling box 12 having a cold spot baffle or flue member 14 in accordance with the present invention.

Figure 2:
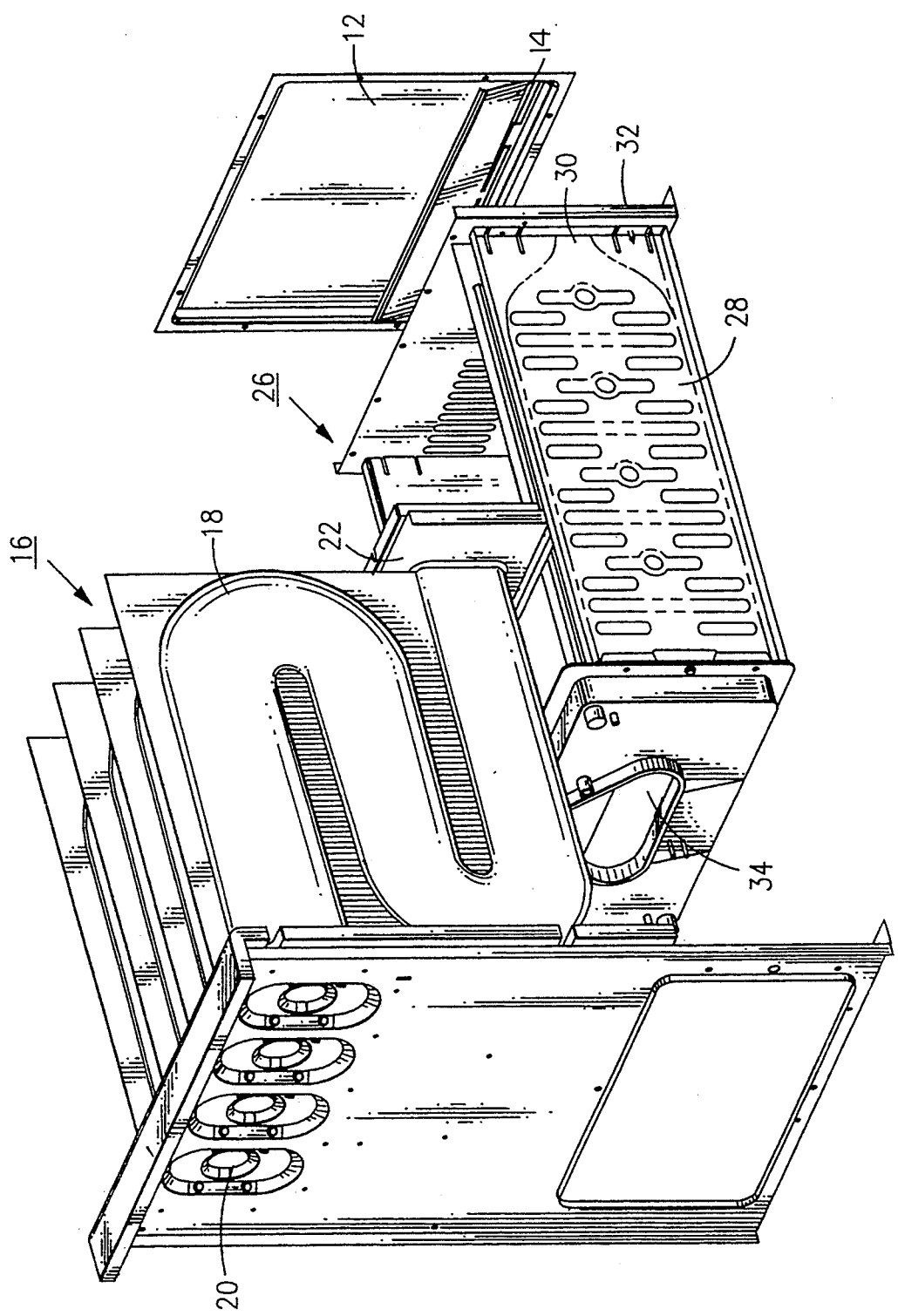
FIG. 2 is a perspective view of the coupling box of the present invention shown disassociated from the primary and condensing heat exchangers of a condensing furnace.
Figure 3:
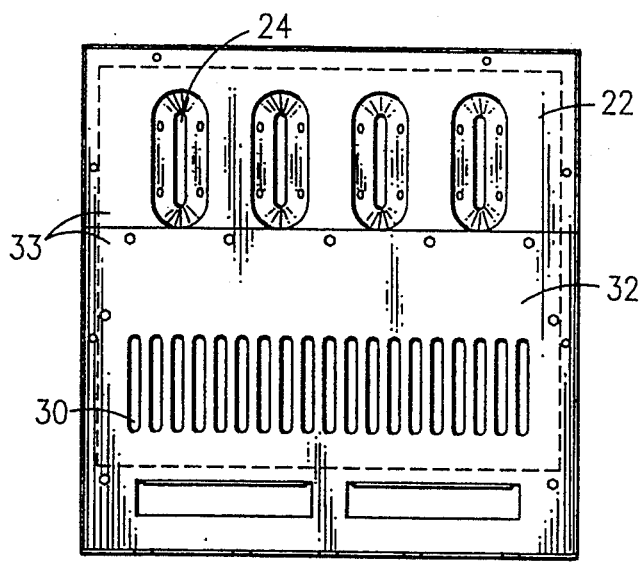
FIG. 3 is a rear elevational view of the heat exchangers shown in FIG. 2.

The condensing furnace shown in FIG. 1 includes a primary heat exchanger 16 and a secondary or condensing heat exchanger 26 as shown in FIG. 2. The primary heat exchanger 16 includes channeled cells 18 for directing the flue gas through the heat exchanger 16. Inlet ports 20 of the primary heat exchanger 16 receive the combustion products and flue gas as they exit burners contained in the burner box (not shown) positioned proximate to the ports 20. The heated flue gas then passes through the channels provided in the cells 18 and is eventually directed to the discharge side of the primary heat exchanger 16. The discharge side of the primary heat exchanger 16 includes a rectangular sheet metal panel or member 22 as shown in FIGS. 2 and 3. The sheet metal panel 22 is formed to receive discharge ports 24 of the primary heat exchanger cells 18.

Referring again to FIG. 2, the condensing heat exchanger 26 is shown positioned below the primary heat exchanger 16. The condensing heat exchanger 26 includes condensing heat exchanger cells 28. The condensing heat exchanger 26 would typically include a plurality of cells 28 positioned in a side by side manner as the cells 18 of the primary heat exchanger 16 are positioned. For the ease of illustration, however, only one condensing cell 28 is shown in phantom in FIG. 2. Each of the condensing cells 28 includes an inlet port 30. All of the inlet ports 30, as shown in FIG. 3, are secured and incorporated into the inlet side of the condensing heat exchanger that includes a rectangular sheet metal panel or member 32 for receiving and securing therein the inlet ports 30 of the condensing cells 28.

The two sheet metal panels 22 and 32 of the primary and condensing heat exchangers, respectively, join together to form a single planar region 33, shown in dashed lines in FIG. 3, when the heat exchangers 16 and 26 are properly positioned on top of each other within the condensing furnace 10.

The condensing heat exchanger cells 28 eventually discharge the flue gas through a venting hole 34 shown in FIG. 2. During installation of the condensing furnace, the venting hole 34 would be connected to an inducer (not shown) to vent the flue gas through vent piping to an exterior location.

Figure 4:
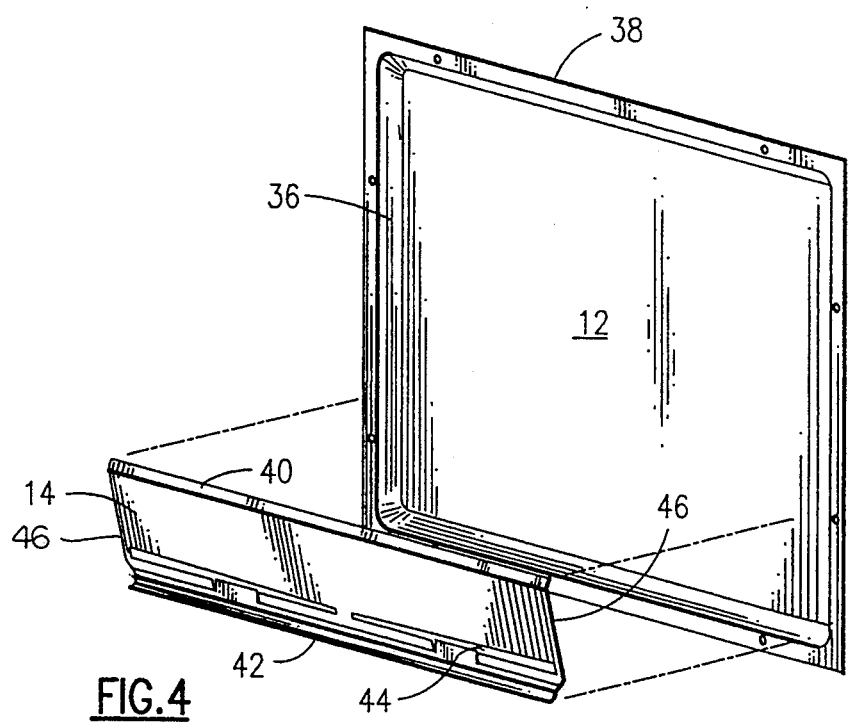
FIG. 4 is a perspective view of the coupling box showing the baffle disassociated from the box.

Referring now to FIG. 4 there is shown the coupling box 12 and the cold spot baffle 14 disassociated therefrom. The coupling box 12 includes a raised edge portion 36. The raised edge portion creates the panshaped form of the coupling box 12. The raised edge portion 36 also includes an outwardly extending flange portion 38 for securing the coupling box to the single planar region 33 that includes the discharge ports of the primary heat exchanger and the inlet ports of the condensing heat exchanger. The cold spot baffle 14 includes an upper edge 40 and a lower edge 42. The lower edge 42 of the baffle 14 includes a number of openings or slots 44 extending along the length of the lower edge 42. The cold spot baffle also includes opposite ends 46. Upon formation of the coupling box in accordance with the present invention, the cold spot baffle 14 is positioned within the lower portion of the coupling box 12 with the opposite ends 46 snugly positioned against the raised edge portion 36 as shown in FIGS. 2 and 4. The baffle 14 is secured to the coupling box 12 along its lower edge 42 by toggle fasteners known in the art. Once the baffle 14 is secured in the coupling box 12, the upper edge 40 extends beyond the flange 38 as shown in FIG. 2.

Figure 5:
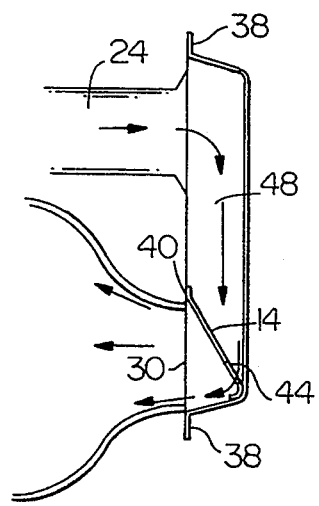
FIG. 5 is a schematic representation showing the flow of flue gas through the coupling box according to the present invention.

The coupling box 12 including the baffle 14 is secured to the heat exchangers to cover the planar region 33 shown in FIG. 3. The flange portion 38 is secured to the planar region by means of sheet metal screws. As the coupling box 12 is secured to the heat exchangers to cover planar region 33, the upper edge 40 of the baffle 14 will interfere with the surface of sheet metal panel 32 just above the inlet ports 30. As the coupling box is securely fastened to the heat exchangers, the upper edge 40 of the baffle 14 will flex slightly backward to provide a seal between the sheet metal panel 32 and the upper edge 40 of the baffle 14. A chamber 48, as shown in FIG. 5, is created once the coupling box 12 is thus secured. Chamber 48 places the discharge ports 24 of the primary heat exchanger in fluid communication within the inlet ports 30 of the condensing heat exchanger. In this condition the baffle 14 creates two regions within the chamber 48.

Prior art coupling boxes did not include baffle 14. Thus as the hot flue gas would exit discharge ports 24 and enter inlet ports 30, a cold spot would form in the lower bottom region of the coupling box wherein the flue gas would not circulate. These cold spots would cause water vapor to condense in the coupling box. The coupling box of the present invention including the cold spot baffle 14 directs the flow of hot flue gas through the coupling box so that the lower bottom surfaces of the coupling box receive a direct flow of hot flue gas. In this manner, the lower bottom region of the coupling box is kept at the same temperature as the rest of the box 12 so that condensation will not form at that bottom location.

The coupling box of the present invention shown and described maintains a temperature equilibrium within the coupling box so that condensing of water vapor will not occur therein. This prevents corrosion and ultimate failure of the coupling box which would result in the undesirable discharge of flue gas into the immediate vicinity.

While this invention has been described in detail with reference to a certain preferred embodiment, it should be appreciated that the present invention is not limited to that precise embodiment. Rather, in view of the present disclosure, many modifications and variations would present themselves to those of skill in the art without departing from the scope and spirit of this invention, as defined in the appended claims.

What is claimed is:

1. In a furnace having a primary heat exchanger with a discharge side and a condensing heat exchanger with an inlet side, the improvement comprising:

coupling means having surfaces for fluidly connecting the discharge side of the primary heat exchanger to the inlet side of the condensing heat exchanger so that flue gas produced by operation of the furnace is directed between the heat exchangers, said coupling means having an isolated surface, near said condensing heat exchanger inlet side, which is susceptible to the formation of cold spots; and baffle means positioned within said coupling means for directing flue gas passing therethrough over said surfaces to maintain temperature equilibrium within said coupling means whereby condensation is prevented from forming therein;

said baffle means being an elongated member and including:

a lower edge portion having a plurality of openings formed therein so that flue gas exiting said discharge ports passes through said plurality of openings and over said isolated surface prior to entering said inlet ports of the condensing heat exchanger.

2. The improved furnace according to claim 1 wherein the discharge side of the primary heat exchanger includes a series of discharge ports formed in a first rigid planar member, and the inlet side of the condensing heat exchanger includes a series of inlet ports formed in a second rigid planar member, said first and second rigid members being positioned adjacent each other to form a planar region having a predetermined surface area.

3. The improved furnace according to claim 2 wherein said coupling means includes a shallow rectangular pan-shaped member having a raised side portion and an outwardly extending flange formed around the periphery of the side portion so that said pan-shaped member can be secured to said planar region to cover the region thereby creating a chamber that places said discharge and inlet ports in fluid communication.

4. In a furnace having a primary heat exchanger with a discharge side that includes a series of discharge ports formed in a first rigid planar member, and a condensing heat exchanger with an inlet side that includes a series of inlet ports formed in a second rigid planar member, the first and second rigid members being positioned adjacent each other to form a planar region having a predetermined surface area, the improvement comprising:

a shallow rectangular pan-shaped member having raised side portions;

an outwardly extending flange formed around said raised side portions of the pan-shaped member so that said pan-shaped member can be secured to the planar region to cover the region thereby creating a chamber that places the discharge and inlet ports in fluid communication; and an elongated flue member for directing the flow of flue gas within the pan-shaped member so that water vapor does not condense therein; and wherein said elongated flue member further includes:

opposed ends, each of said ends being positioned snugly against opposed raised side portions of said pan-shaped member;

a lower edge portion having a plurality of openings formed therein, the lower edge extending along the length of a raised side portion existing between said opposed side portions, and being attached to said pan-shaped member along said length; and an upper edge portion extending beyond the outwardly directed flange portion whereby when said flange portion is attached to the planar region, said upper edge of the flue member seals thereagainst so that flue gas exiting said discharge ports passes through said plurality of openings prior to entering said inlet ports of the condensing heat exchanger.

5. In a furnace having a primary heat exchanger with a discharge side that includes a series of discharge ports formed in a first rigid planar member, and a condensing heat exchanger with an inlet side that includes a series of inlet ports formed in a second rigid planar member, the first and second rigid members being positioned adjacent each other to form a planar region having a predetermined surface area, the improvement comprising:

a shallow rectangular pan-shaped member having raised side portions;

an outwardly extending flange formed around said raised side portions of the pan-shaped member so that said pan-shaped member can be secured to the planar region to cover the region thereby creating a chamber that places the discharge and inlet ports in fluid communication; and an elongated flue member for directing the flow of flue gas within the pan-shaped member so that water vapor does not condense therein, said elongated flue member including:

opposed ends, each of said ends being positioned snugly against opposed raised side portions of said pan-shaped member;

a lower edge portion having a plurality of openings formed therein, the lower edge extending along the length of a raised side portion existing between said opposed side portions, and being attached to said pan-shaped member along said length; and an upper edge portion extending beyond the outwardly directed flange portion;

whereby when said flange portion is attached to said planar region, said upper edge of the flue member seals thereagainst so that flue gas exiting the discharge ports passes through said plurality of openings prior to entering the inlet ports of the condensing heat exchanger.

* * * * *